(12) United States Patent
Lee et al.

(10) Patent No.: US 9,225,046 B2
(45) Date of Patent: Dec. 29, 2015

(54) PROTECTED ANODE AND LITHIUM AIR BATTERY AND ALL-SOLID BATTERY INCLUDING PROTECTED ANODE

(71) Applicants: Dong-joon Lee, Yongin-si (KR); Osamu Yamamoto, Tsu (JP); Nobuyuki Imanishi, Tsu (JP); Dong-min Im, Seoul (KR); Yasuo Takeda, Tsu (JP)

(72) Inventors: Dong-joon Lee, Yongin-si (KR); Osamu Yamamoto, Tsu (JP); Nobuyuki Imanishi, Tsu (JP); Dong-min Im, Seoul (KR); Yasuo Takeda, Tsu (JP)

(73) Assignees: SAMSUNG ELECTRONICS CO., LTD., Suwon-Si (KR); NATIONAL UNIVERSITY CORPORATION MIE UNIVERSITY, Tsu (JP)

( * ) Notice: Subject to any disclaimer, the term of this patent is extended or adjusted under 35 U.S.C. 154(b) by 270 days.

(21) Appl. No.: 13/630,529

(22) Filed: Sep. 28, 2012

(65) Prior Publication Data
US 2013/0149616 A1 Jun. 13, 2013

(30) Foreign Application Priority Data
Dec. 13, 2011 (KR) ........................ 10-2011-0134004

(51) Int. Cl.
*H01M 4/36* (2006.01)
*H01M 4/02* (2006.01)
(Continued)

(52) U.S. Cl.
CPC .............. *H01M 12/06* (2013.01); *H01M 4/485* (2013.01); *H01M 4/5825* (2013.01); *H01M 10/052* (2013.01); *H01M 10/0562* (2013.01); *H01M 12/08* (2013.01); *Y02E 60/122* (2013.01)

(58) Field of Classification Search
CPC ... H01M 4/485; H01M 4/5825; H01M 12/06; H01M 12/08; H01M 10/052; H01M 10/0562
USPC .......... 429/231.95, 144, 233, 405, 231.1, 207
See application file for complete search history.

(56) References Cited

U.S. PATENT DOCUMENTS 6,025,094 A    2/2000   Visco et al. .............. 429/231.95
6,030,909 A *  2/2000   Fu .................................. 501/10
(Continued)

FOREIGN PATENT DOCUMENTS

JP    2009-170400    7/2009
JP    2010-3694      1/2010
(Continued)

OTHER PUBLICATIONS

Salkus, "Investigation of the Correlation Between Structure, Elemental Composition, and Charge Carriers' Transport in Li+, V++ Solid Electrolytes", Vilnius University Semiconductor Physics Institute, Summary of doctoral dissertation, Vilnius, 2009, 28 pages.*

(Continued)

*Primary Examiner* — Kenneth Douyette
(74) *Attorney, Agent, or Firm* — Stein IP, LLC

(57) ABSTRACT

A protected anode including an anode including a lithium titanium oxide; and a protective layer including a compound represented by Formula 1 below, a lithium air battery including the same, and an all-solid battery including the protected anode:

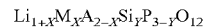

<Formula 1>

$Li_{1+X}M_XA_{2-X}Si_YP_{3-Y}O_{12}$ wherein M may be at least one of aluminum (Al), iron (Fe), indium (In), scandium (Sc), or chromium (Cr),
A may be at least one of germanium (Ge), tin (Sn), hafnium (Hf), and zirconium (Zr),
$0 \leq X \leq 1$, and
$0 \leq Y \leq 1$.

17 Claims, 8 Drawing Sheets

(51) Int. Cl.
  *H01M 12/06* (2006.01)
  *H01M 4/485* (2010.01)
  *H01M 4/58* (2010.01)
  *H01M 10/052* (2010.01)
  *H01M 10/0562* (2010.01)
  *H01M 12/08* (2006.01)

(56) References Cited

U.S. PATENT DOCUMENTS

| | | | |
|---|---|---|---|
| 6,824,923 B2* | 11/2004 | Che et al. | 429/231.1 |
| 2002/0012846 A1* | 1/2002 | Skotheim et al. | 429/231.95 |
| 2006/0019167 A1* | 1/2006 | Li | 429/233 |
| 2007/0117007 A1* | 5/2007 | Visco et al. | 429/144 |
| 2008/0052898 A1 | 3/2008 | Visco et al. | |
| 2009/0053594 A1 | 2/2009 | Johnson et al. | |
| 2009/0317724 A1 | 12/2009 | Kumar et al. | |
| 2010/0003694 A1 | 1/2010 | Bahn et al. | |
| 2011/0165462 A1 | 7/2011 | Zhamu et al. | 429/223 |
| 2012/0009469 A1 | 1/2012 | Visco et al. | |
| 2012/0231350 A1 | 9/2012 | Nishida et al. | 429/322 |

FOREIGN PATENT DOCUMENTS

| | | |
|---|---|---|
| KR | 10-2007-0021110 | 2/2007 |
| WO | WO 2011/011082 A1 | 1/2011 |
| WO | WO 2011/065388 A1 | 6/2011 |

OTHER PUBLICATIONS

K. Arbi, et al., *Characterization of Lithium Insertion into NASICON-Type $Li_{1+x}Ti_{2-x}Al_x(PO_4)_3$ and Its Electrochemical Behavior*, J. Electrochem Soc., 2010, vol. 157, Issue 6, pp. A654-A659, Published Apr. 19, 2010.

* cited by examiner

PROTECTED ANODE AND LITHIUM AIR BATTERY AND ALL-SOLID BATTERY INCLUDING PROTECTED ANODE

CROSS-REFERENCE TO RELATED APPLICATION

This application claims the benefit of Korean Application No. 10-2011-0134004, filed on Dec. 13, 2011 in the Korean Intellectual Property Office, the disclosure of which is incorporated herein by reference.

BACKGROUND

1. Field

Aspects of the present invention relate to protected anodes, lithium air batteries including the same, and all-solid batteries including the protected anodes.

2. Description of the Related Art

Lithium air batteries are known to include a negative electrode that enables intercalation/deintercalation of lithium ions, a positive electrode including a catalyst for oxidation and reduction of oxygen in air that is used as a positive active material, and a lithium ion-conducting medium interposed between the positive electrode and the negative electrode.

Lithium air batteries have a theoretical energy density of 3,000 Wh/kg or more, which is approximately 10 times greater than that of lithium ion batteries. In addition, lithium air batteries are environmentally friendly and more stable than lithium ion batteries, and thus, research into lithium ion batteries is being actively conducted.

Metallic lithium is used as a negative active material of a lithium air battery because the lithium air battery has high capacity. However, metallic lithium is unstable and highly reactive, and thus, it is sensitive to heat or impact and has a high risk of explosion. When a negative electrode including metallic lithium is charged, a large amount of dendrite lithium is deposited on a surface of the metallic lithium. As a result, charge and discharge efficiencies of lithium air batteries deteriorate or the negative electrode may be disconnected from the positive electrode.

SUMMARY

Aspects of the present invention provide protected anodes with high stability.

Aspects of the present invention provide lithium air batteries including the protected anodes.

Aspects of the present invention provide all-solid batteries including the protected anodes.

According to an aspect of the present invention, a protected anode includes an anode including a lithium titanium oxide; and a protective layer formed on the surface of the anode and including a compound represented by Formula 1 below:

$$\text{Li}_{1+X}\text{M}_X\text{A}_{2-X}\text{Si}_Y\text{P}_{3-Y}\text{O}_{12} \qquad \text{<Formula 1>}$$

wherein M may be at least one of aluminum (Al), iron (Fe), indium (In), scandium (Sc), or chromium (Cr), A may be at least one metal of germanium (Ge), tin (Sn), hafnium (Hf), or zirconium (Zr), $0 \leq X \leq 1$, and
$0 \leq Y \leq 1$.

According to another aspect of the present invention, a lithium air battery includes the protected anode described above; and a cathode including oxygen as a cathode active material.

According to another aspect of the present invention, an all-solid battery includes the protected anode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
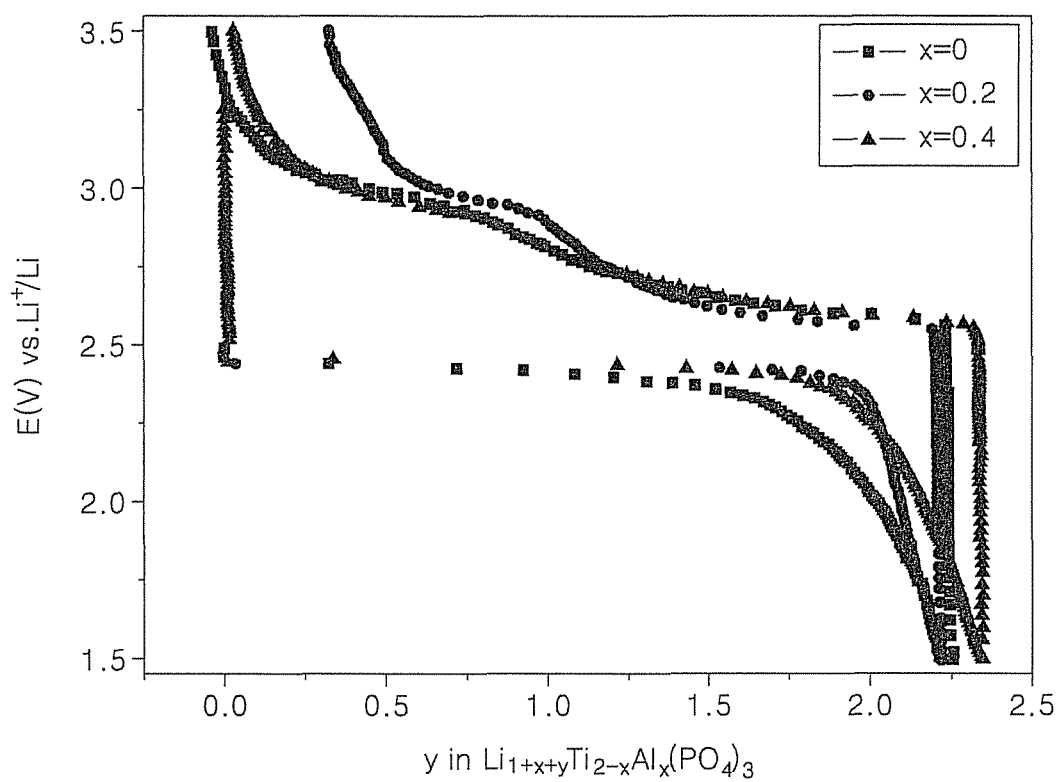
FIG. 1 is a graph showing a charge/discharge profile of a cell represented by lithium (Li)/Li$_{1+x}$Ti$_{2-x}$Al(PO$_4$)$_3$ where $0 \leq X \leq 4$.

Reference will now be made in detail to the present embodiments of the present invention, examples of which are illustrated in the accompanying drawings, wherein like reference numerals refer to like elements throughout. The embodiments are described below to explain aspects of the present invention by referring to the figures.

Hereinafter, exemplary embodiments of a protected anode, a lithium air battery including the same, and an all-solid battery including the protected anode will be described in detail with reference to the accompanying drawings.

According to an embodiment of the present invention, a protected anode includes an anode including lithium titanium oxide; and a protective layer including on a surface of the anode a compound represented by Formula 1 below:

$$\text{Li}_{1+X}\text{M}_X\text{A}_{2-X}\text{Si}_Y\text{P}_{3-Y}\text{O}_{12} \qquad \text{<Formula 1>}$$

wherein M may be at least one of aluminum (Al), iron (Fe), indium (In), scandium (Sc), or chromium (Cr), A may be at least one of germanium (Ge), tin (Sn), hafnium (Hf), or zirconium (Zr), $0 \leq X \leq 1$, and
$0 \leq Y \leq 1$.

In Formula 1, X may be a number of 0.1 to 0.9, for example, 0.3 to 0.7.

In Formula 1, Y may be a number of 0.1 to 0.9, for example, 0.3 to 0.7.

The compound of Formula 1 may be prepared using one of various known methods in the art.

FIG. 1 is a graph showing a charge/discharge profile of a cell represented by lithium (Li)/Li$_{1+x}$Ti$_{2-x}$Al(PO$_4$)$_3$ where $0 \leq X \leq 4$ (Journal of The Electrochemical Society, 157(6), A654-A659 (2010)).

When a $Li_{1+x}Ti_{2-x}Al(PO_4)_3$ (hereinafter, referred to as "LTAP") protective layer is formed on a surface of metallic lithium, LTAP, which has a relatively high reduction voltage, reacts with lithium of a metallic lithium electrode and thus lithium ions are intercalated at 2.5 V (vs. Li+/Li) or less, which renders the protective layer unstable. Thus, in this case, an interlayer formed of $Li_3N$, LiPON, lithium bis(trifluoromethanesulfonyl)imide (LiTFSI)/polyethylene oxide (PEO), or the like is needed. That is, it is difficult to use LTAP as a material for forming a protective layer of a Li anode without the interlayer.

Therefore, the inventors of the present invention researched and found that when lithium titanium oxide (which has a higher potential than that of lithium) was used as an anode active material and the compound of Formula 1 (which has a relatively lower reduction potential than that of LTAP and low reactivity with the lithium titanium oxide) was used as a material for forming a protective layer, an anode that included the anode active material and the material for forming a protective layer had higher stability and interface conductivity than when metallic lithium was used as the active material. Therefore, a battery including the anode exhibited long lifetime, excellent high-rate characteristics, and high conductivity. This will now be described in more detail.

When lithium ions are intercalated into $Li_4Ti_5O_{12}$ as a lithium titanium oxide, the lithium titanium oxide reaches a two-phase equilibrium state ($Li_4Ti_5O_{12} \leftrightarrow Li_7Ti_5O_{12}$) and thus has a more constant intercalation/deintercalation potential than the intercalation/deintercalation potential of a $Lr^+/Li$ pair. As a result, charge and discharge processes can occur and the lithium titanium oxide has sufficient electronic conductivity. In addition, the lithium intercalation/deintercalation potential of a pair of $Li_4Ti_5O_{12}/Li_7Ti_5O_{12}$ of the lithium titanium oxide is about 1.5 V. The risk of formation of dendrites may be avoided at this potential. Moreover, $Li_4Ti_5O_{12}$ is highly chemically and thermally stable and non-toxic and has a high electrochemical efficiency. A battery including such a lithium titanium oxide may have a charge/discharge voltage of about 1.5 V and is more highly stable than a battery including a graphite-based material. The lithium titanium oxide is a material with little change in lattice constant during intercalation/deintercalation of lithium ions and has high reversibility and a long lifetime.

However, a battery manufactured using an anode including the aforementioned lithium titanium oxide as an anode active material may have reduced capacity. In addition, the battery may have decreased performance due to a reaction between oxygen and an electrolyte. Therefore, to address these problems, a protective layer including the compound of Formula 1 may be formed on an anode including the lithium titanium oxide.

When the protective layer including the compound of Formula 1 is formed as described above, it is not necessary to form an interlayer between the anode and the protective layer, unlike when the aforementioned LTAP is used. Without the interlayer, a protected anode with excellent charge and discharge characteristics and high capacity may be obtained.

Figure 2:
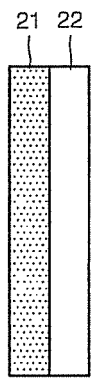
FIG. 2 is a diagram illustrating a structure of a protected anode according to an embodiment of the present invention.

FIG. 2 is a diagram illustrating the structure of a protected anode according to an embodiment of the present invention. Referring to FIG. 2, the protected anode includes an anode 21 including a lithium titanium oxide and a protective layer 22 including the compound of Formula 1 on the anode 21. The protected anode has very high stability without an interlayer between the anode 21 and the protective layer 22, and thus, a battery including the protected anode has improved charge and discharge characteristics and conductivity.

The thickness ratio of the anode 21 to the protective layer 22 may be, but is not limited to, about 0.001:1 to about 1,000:1, for example, about 0.01:1 to about 100:1.

The thickness of the anode 21 including a lithium titanium oxide is in the range of about 10 to about 300 μm, and the thickness of the protective layer 22 is in the range of about 10 to about 500 μm. The thickness of the protected anode including the anode 21 and the protective layer 22 may be in the range of about 20 to about 800 μm.

The compound of Formula 1 may be represented by Formula 2 below:

$Li_{1+X}Al_XGe_{2-X}(PO_4)_3$ <Formula 2> wherein $0 \leq X \leq 1$.

In Formula 2, X may be a number of 0.1 to 0.9, for example, 0.3 to 0.7.

The compound of Formula 1 may be $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, or $Li_{1.7}Al_{0.7}Ge_{1.3}(PO_4)_3$.

The lithium titanium oxide may be represented by Formula 3 below:

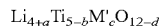
$Li_{4+a}Ti_{5-b}M'_cO_{12-d}$ <Formula 3> wherein $-0.2 \leq a \leq 0.2$, $-0.3 \leq b \leq 0.3$, $0 \leq c \leq 0.3$, $-0.3 \leq d \leq 0.3$, and M' is at least one of a Group 1 element through a Group 6 element or a Group 8 element through a Group 15 element.

In Formula 3, M' may be lithium (Li), sodium (Na), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), or arsenic (As).

The compound of Formula 3 has a spinel-type structure, and, for example, may be $Li_4Ti_5O_{12}$ or $Li_7Ti_5O_{12}$.

In one embodiment, the lithium titanium oxide may be $Li_4Ti_5O_{12}$ or $Li_7Ti_5O_{12}$, and the compound of Formula 1 may be $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, or $Li_{1.7}Al_{0.7}Ge_{1.3}(PO_4)_3$.

The interlayer interposed between the anode and the protective layer may include at least one of a separator, a liquid electrolyte including a non-aqueous solvent and a lithium salt, an inorganic solid electrolyte membrane, a polymer solid electrolyte membrane, a gel-type polymer electrolyte, or a lithium ion conductive solid electrolyte membrane.

The liquid electrolyte includes a non-aqueous solvent and a lithium salt.

The non-aqueous solvent may be a carbonate-based solvent, an ester-based solvent, an ether-based solvent, a ketone-based solvent, an amine-based solvent, or a phosphine-based solvent.

Examples of the carbonate-based solvent include dimethyl carbonate (DMC), diethyl carbonate (DEC), ethyl methyl carbonate (methyl ethyl carbonate, EMC or MEC), dipropyl carbonate (DPC), methyl propyl carbonate (MPC), ethyl propyl carbonate (EPC), ethylene carbonate (EC), propylene carbonate (PC), and butylene carbonate (BC).

Examples of the ester-based solvent include methyl acetate, ethyl acetate, n-propyl acetate, tert-butyl acetate, methyl propionate, ethyl propionate, γ-butyrolactone, 5-decanolide, γ-valerolactone, dl-mevalonolactone, and ε-caprolactone.

Examples of the ether-based solvent include dibutyl ether, tetraglyme, diglyme, dimethoxyethane, 2-methyl tetrahydrofuran, and tetrahydrofuran. The ketone-based solvent may be, for example, cyclohexanone.

The amine-based solvent may be triethylamine or triphenylamine. The phosphine-based solvent may be triethyl phosphine. The non-aqueous solvent, however, is not limited to the above examples, and any non-protonic solvent used in the art may be used.

Examples of the non-protonic solvent include nitriles represented by R—CN where R is a linear, branched, or cyclic hydrocarbon group having 2 to 20 carbons, and R may have a double bond aromatic ring or ether bond, amides such as dimethylformamide, dioxolanes such as 1,3-dioxolane, and sulfolanes.

The non-protonic solvent may be used alone or in combination with at least one other solvent. When the non-protonic solvent is used in combination with at least one other solvent, the mixing ratio may be appropriately adjusted according to designed cell performances and may be determined by one of ordinary skill in the art.

The liquid electrolyte may include an ionic liquid. The ionic liquid may be a compound consisting of a cation, such as a linear or branched, substituted ammonium cation, a linear or branched, substituted imidazolium cation, a linear or branched, substituted pyrrolidinium cation or a linear or branched, substituted piperidinium cation, and an anion, such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$.

The lithium salt may be dissolved in a solvent and act as a supplier for lithium ions in a battery. For example, the lithium salt may facilitate the movement of lithium ions between an anode and a lithium ion conductive electrolyte membrane.

The lithium salt may be at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$(where x and y are each independently a natural number), LiF, LiBr, LiCl, LiI, or $LiB(C_2O_4)_2$ (lithium bis (oxalato)borate) (LiBOB).

The content of the lithium salt may be in the range of about 0.01 to about 10M, for example, in the range of about 0.1 to about 2.0M. If the content of the lithium salt is within this range, an electrolyte has appropriate conductivity and viscosity and thus may exhibit excellent electrolyte performance and allow lithium ions to effectively migrate.

The liquid electrolyte may further include other metal salts, in addition to the lithium salt. Examples of the metal salts include $AlCl_3$, $MgCl_2$, NaCl, KCl, NaBr, KBr, or $CaCl_2$.

The separator is not particularly limited as long as it has high endurance during lithium air battery operations. For example, the separator may be a porous film formed of polypropylene or polyethylene, or a polymer non-fabric, such as a polypropylene non-fabric or a polyphenylene sulfide non-fabric. The separator material may be used in combination of at least two of these materials.

The inorganic solid electrolyte membrane may be formed of $Cu_3N$, $Li_3N$, or LiPON.

The polymer solid electrolyte membrane may be a polyethylene oxide membrane.

According to another embodiment of the present invention, a lithium air battery includes the protected anode described above and a cathode including oxygen as a cathode active material.

Figure 3A:
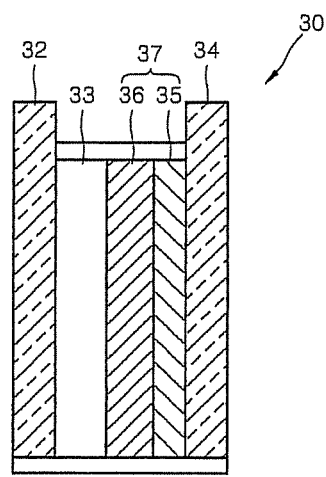
FIGS. 3A and 3B are schematic diagrams illustrating structures of lithium air batteries according to embodiments of the present invention.
Figure 3B:
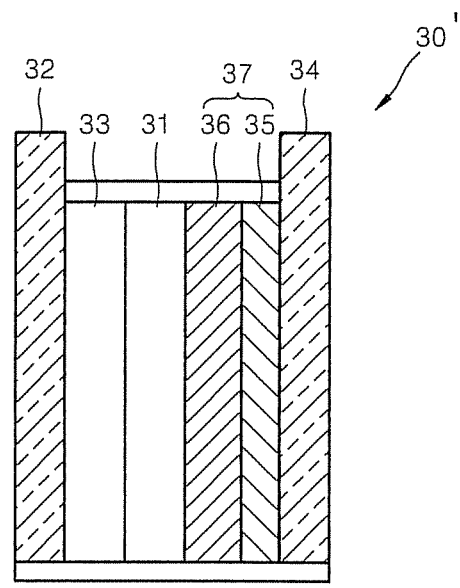

Hereinafter, the lithium air battery will be described in more detail. FIGS. 3A and 3B are schematic diagrams illustrating structures of lithium air batteries 30 and 30' according to embodiments of the present invention. The lithium air battery 30 includes a cathode 33 that is formed on a first current collector 32 and includes oxygen as an active material and a protected anode 37 that is formed adjacent to a second current collector 34 and enables intercalation/deintercalation of lithium ions. The protected anode 37 includes an anode 35 including a lithium titanium oxide and a protective layer 36 including the compound of Formula 1.

The lithium air battery 30' may further include an interlayer (not shown) between the anode 35 and the protective layer 36. As described above, the interlayer may include at least one of a liquid electrolyte including a non-aqueous solvent and a lithium salt, an inorganic solid electrolyte membrane, a polymer solid electrolyte membrane, a gel-type polymer electrolyte membrane, or a separator.

The lithium air battery 30 may have a structure as illustrated in FIG. 3A in which an interlayer is not disposed between the protected anode 37 and the cathode 33. Alternatively, as illustrated in FIG. 3B, the lithium air battery 30' may have a structure in which an interlayer 31 is disposed between the protected anode 37 and the cathode 33. The interlayer 31 may include at least one material of a separator, a liquid electrolyte including a non-aqueous solvent and a lithium salt, an inorganic solid electrolyte membrane, a polymer solid electrolyte membrane, a gel-type polymer electrolyte, or a lithium ion conductive solid electrolyte membrane; the interlayer 31 may be disposed between the cathode 33 and the protected anode 37.

The inorganic solid electrolyte membrane may be formed of $Cu_3N$, $Li_3N$, or LiPON.

A detailed description of the non-aqueous solvent is already provided above.

In FIGS. 3A and 3B, the thickness of each element is exaggerated for clarity of the specification; however, it is not limited thereto.

The liquid electrolyte may be partially or entirely impregnated in the cathode.

The polymer electrolyte membrane may be prepared by mixing a lithium ion conductive polymer and a lithium salt. The amount and type of the lithium salt is already described in the description of the protected anode.

Examples of the lithium ion conductive polymer include polyethylene oxide, polyacrylonitrilie, and polyester.

The lithium ion conductive solid electrolyte membrane used as an interlayer may include at least one of inorganic materials or polymer solid electrolyte components.

The lithium ion conductive solid electrolyte membrane may be a glass-ceramic solid electrolyte or a laminated structure of a glass-ceramic solid electrolyte or a polymer solid electrolyte. The lithium ion conductive solid electrolyte membrane will now be described in more detail.

A material for forming the lithium ion conductive solid electrolyte membrane may be lithium ion conductive glass, lithium ion conductive crystals (ceramic or glass-ceramic), or an inorganic material containing a mixture thereof. Taking the chemical stability of the lithium ion conductive solid electrolyte membrane into consideration, the lithium ion conductive solid electrolyte membrane may include an oxide.

If the lithium ion conductive solid electrolyte membrane includes a large amount of lithium ion conductive crystals, it has high ionic conductivity. Thus, the amount of the lithium ion conductive crystals may be 50 wt % or more, for example, 55 wt % or more based on the total amount of the lithium ion conductive solid electrolyte membrane.

Examples of the lithium ion conductive crystals include perovskite crystals with lithium ion conductivity, such as Li$_3$N, LISICONs, and La$_{0.55}$Li$_{0.35}$TiO$_3$, LiTi$_2$P$_3$O$_{12}$ crystals having a NASICON structure, and glass-ceramic that deposits these crystals.

For example, the lithium ion conductive crystals may be Li$_{1+x+y}$(Al, Ga)$_x$(Ti, Ge)$_{2+x}$Si$_y$P$_{3-y}$O$_{12}$ where 0≤x≤1, 0≤y≤1, for example, 0≤x≤0.4 and 0≤y≤0.6, or 0.1≤x≤0.3 and 0.10≤y≤0.4. If the lithium ion conductive crystals are crystals not including grain boundaries that inhibit ionic conductivity, the lithium ion conductive crystals may be glass in terms of conductivity. For example, glass-ceramic barely contains pores or grain boundaries that inhibit ionic conductivity and thus may have high ionic conductivity and chemical stability.

Examples of the lithium ion conductive glass-ceramic include lithium-aluminum-germanium-phosphate (LAGP), lithium-aluminum-titanium-phosphate (LATP), and lithium-aluminum-titanium-silicon-phosphate (LATSP).

For example, when the parent glass having a composition of Li$_2$O—Al$_2$O$_3$—TiO$_2$—SiO$_2$—P$_2$O$_5$ is crystallized by heat treatment, the main crystal phase of the parent glass consists of Li$_{1+x+y}$Al$_x$Ti$_{2-x}$Si$_y$P$_{3-y}$O$_{12}$ where 0≤x≤1 and 0≤y≤1. In this regard, x and y may satisfy the conditions: 0≤x≤4 and 0≤y≤0.6. In particular, x and y may satisfy the conditions: 0.1≤x≤0.3 and 0.1≤y≤0.4.

The term "pores or grain boundaries that inhibit ionic conductivity" used herein refer to ionic conductivity-inhibiting materials, such as pores or grain boundaries that reduce the conductivity of an inorganic material including lithium ion conductive crystals to a tenth or less with respect to the conductivity of the lithium ion conductive crystals in the inorganic material.

The glass-ceramic refers to a material obtained by heat treating glass to deposit a crystalline phase in a glass phase. The glass-ceramic may include materials consisting of amorphous solid and crystals and also include materials in which all glass phases are phase-transited to crystalline phases, for example, materials in which the amount of crystals is 100 mass %. In the completely (100%) crystallized materials, almost no holes exist between crystal particles or in crystals.

The lithium ion conductive solid electrolyte membrane includes a large amount of the glass ceramic and thus may have high ionic conductivity. Therefore, 80 wt % or more of lithium ion conductive glass ceramic may be included in the lithium ion conductive solid electrolyte membrane. To obtain higher ionic conductivity, the amount of the lithium ion conductive glass ceramic in the lithium ion conductive solid electrolyte membrane may be 85 wt % or greater or 90 wt % or greater.

An Li$_2$O component included in the glass-ceramic provides a Li$^+$ ion carrier and is usefully used to obtain lithium ion conductivity. The amount of the Li$_2$O component may be from about 12% to about 18%, for example, 12%, 13%, 14%, 16%, 17% or 18%. If the amount of the Li$_2$O component is within this range, this may facilitate the formation of the glass-ceramic with excellent thermal stability and conductivity. The term "%" used in the amount of the component in the glass-ceramic means "mole %".

An Al$_2$O$_3$ component included in the glass-ceramic increases the thermal stability of a parent glass and also effectively increases lithium ion conductivity such that Al$^{3+}$ ions are introduced into the crystalline phase. The amount of the Al$_2$O$_3$ component may be from about 5% to about 10%, for example, 5%, 5.5%, 6%, 9%, 9.5%, or 10%. If the amount of the Al$_2$O$_3$ component is within this range, the glass-ceramic has excellent conductivity without decreasing of thermal stability.

A TiO$_2$ component included in the glass-ceramic contributes to the formation of glass, is a constituent of the crystalline phase, and is an essential component in glass and the crystals. The amount of the TiO$_2$ component may be from about 35% to about 45%, for example, 35%, 36%, 37%, 42%, 43% or 45%. If the amount of the TiO$_2$ component is within this range, the glass-ceramic with high thermal stability and conductivity is obtained.

An SiO$_2$ component included in the glass-ceramic may increase the melting properties and thermal stability of a parent glass and also contributes to improvement of lithium ion conductivity such that Si$^{4+}$ ions are introduced into the crystalline phase. The amount of the SiO$_2$ component may be from about 1% to about 10%, for example, 1%, 2%, 3%, 7%, 8%, or 10%. If the amount of the SiO$_2$ component is within this range, the glass-ceramic has good conductivity.

A P$_2$O$_5$ component included in the glass-ceramic is usefully used to form glass and a constituent of the crystalline phase. The amount of the P$_2$O$_5$ component is from about 30% to about 40%, for example, 30%, 32%, 33%, 38%, 39% or 40%. If the amount of the P$_2$O$_5$ component is within this range, it is easy to glassify the glass-ceramic and to form the precipitation of the crystalline phase from the glass-ceramic.

In the case of the parent glass consisting of the components described above, glass may be easily obtained by casting a melted glass, and a glass-ceramic with the crystalline phase which is obtained by heat treating the glass may have high lithium ion conductivity, i.e., $1 \times 10^{-3}$ S·cm$^{-1}$.

Also, if a glass-ceramic having a similar crystalline structure is used, part or all of the components may be substituted. For example, the Al$_2$O$_3$ component may be substituted with a Ga$_2$O$_3$ component and the TiO$_2$ component may be substituted with a GeO$_2$ component. Moreover, when the glass-ceramic is prepared, a small amount of other raw materials may be added within ranges that do not largely deteriorate ionic conductivity in order to reduce the melting point of the glass-ceramic or increase the stability of glass.

The lithium ion conductive solid electrolyte membrane may further include a polymer solid electrolyte component, in addition to the glass-ceramic component. The polymer solid electrolyte is a lithium salt-doped polyethylene oxide, and examples of the lithium salt include LiN(SO$_2$CF$_2$CF$_3$)$_2$, LiBF$_4$, LiPF$_6$, LiSbF$_6$, LiAsF$_6$, LiClO$_4$, LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_3$CF$_3$)$_2$, LiC$_4$F$_9$SO$_3$, and LiAlCl$_4$.

The polymer solid electrolyte membrane may have a laminated structure including the glass-ceramic. For example, the glass-ceramic may be interposed between a first polymer solid electrolyte and a second polymer solid electrolyte.

The lithium ion conductive solid electrolyte membrane may be in a single layer or multilayer form.

The cathode that uses oxygen as a cathode active material may be formed of a conductive material. The conductive material may also be a porous material. Thus, any cathode active material with porosity and conductivity may be used. For example, a carbonaceous material with porosity may be used. Examples of the carbonaceous material include carbon blacks, graphites, graphenes, activated carbons, and carbon fibers. In addition, a metallic conductive material, such as a metal fiber or a metal mesh may be used as the cathode active material. Also, the cathode active material includes a metallic powder formed of copper, silver, nickel, or aluminum or an organic conductive material such as a polyphenylene derivative. The conductive materials may be used alone or in combination.

A catalyst for oxidation/reduction of oxygen may be added to the cathode. Examples of the catalyst include, but are not limited to, precious metal-based catalysts such as platinum, gold, silver, palladium, ruthenium, rhodium, and osmium;

oxide-based catalysts such as a manganese oxide, an iron oxide, a cobalt oxide, and a nickel oxide; and an organic metal-based catalyst such as cobalt phthalocyanine. Any catalyst for oxidation/reduction of oxygen used in the art may be used.

In addition, the catalyst may be supported on a catalyst support. The catalyst support may be oxide, zeolite, clay-based mineral, or carbon. The oxide may be at least one oxide of alumina, silica, zirconium oxide, and titanium dioxide. The oxide may be an oxide including at least one of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), or tungsten (W). Examples of the carbon include carbon blacks such as carbon black, acetylene black, channel black, and lamp black; graphites such as natural graphite, artificial black, and expandable graphite; activated carbons; and carbon fibers. However, the carbon is not limited to the above examples, and, for example, any catalyst support used in the art may be used.

The cathode may further include a binder. The binder may include a thermo-plastic resin or a thermosetting resin. Examples of the binder include polyethylene, polypropylene, polytetrafluoro ethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer. In this regard, the binder may be used alone or in combination. However, the binder is not limited to the above examples, and any binder used in the art may be used.

The cathode may be prepared by mixing the catalyst for oxidation/reduction of oxygen, the conductive material, and the binder and adding an appropriate solvent thereto to prepare a cathode slurry, coating the cathode slurry on a surface of a current collector, and drying the resultant structure. Alternatively, the cathode may be prepared by compression-molding the cathode slurry to a current collector in order to increase the density of the cathode. In addition, the cathode may selectively include a lithium oxide. In addition, the catalyst for oxidation/reduction of oxygen may not be selectively used.

To rapidly diffuse oxygen, the current collector may be a porous structure in a net or mesh form or a porous metal plate formed of stainless steel, nickel, or aluminum. However, the current collector is not limited to the above examples, and any current collector used in the art may be used. The current collector may be coated with an oxidation resistant metal or alloy in order to prevent the current collector from being oxidized.

The separator is already described above in the description of the protected anode.

The lithium air battery includes the protected anode with a higher stability than that of a pre-existing anode and thus stably operates. As a result, the lithium air battery has improved cell performances, such as charge and discharge characteristics, lifetime, and electrical performance.

The term "air" used herein is not limited to atmospheric air, and refers to either a gas combination including oxygen or a pure oxygen gas. The broad definition of the term "air" may be applied to all kinds of applications including an air battery, or an air cathode.

The lithium air battery may be a lithium primary battery or a lithium secondary battery. Also, the shape of the lithium air battery is not limited. Examples of the shape include a coin-shape, a button-shape, a sheet-shape, a stack-shape, a cylinder-shape, a panel-shape, or a cone shape. Also, the lithium air battery may be used in a large-size battery for electrical vehicles.

According to another embodiment of the present invention, an all-solid battery includes the protected anode described above.

The protected anode includes an anode including a lithium titanium oxide; and a protective layer including a compound represented by Formula 1 below, wherein the protected anode has a structure in which the protective layer is directly formed on the anode without an interlayer interposed therebetween:

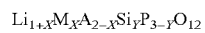
<Formula 1>

$$Li_{1+X}M_XA_{2-X}Si_YP_{3-Y}O_{12}$$  <Formula 1> wherein M may be at least one of Al, Fe, In, Sc, or Cr,
A may be at least one of Ge, Sn, Hf, and Zr,
$0 \leq X \leq 1$, and
$0 \leq Y \leq 1$.

Constituents of the all-solid battery are all in a solid state and thus the all-solid battery may have increased reliability, be more miniaturized, and be manufactured in a thin film type.

The anode including a lithium titanium oxide includes a solid electrolyte.

Figure 4:
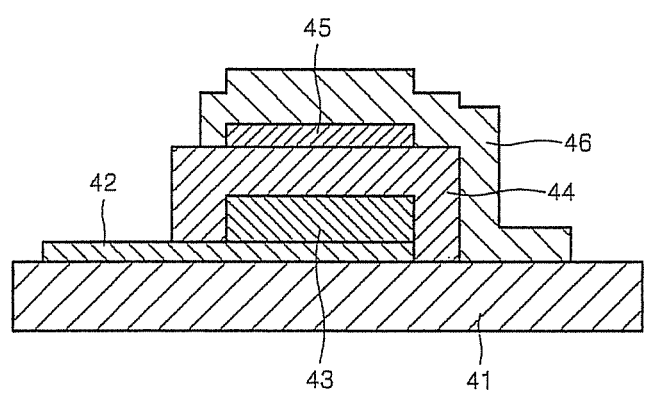
FIG. 4 is a diagram illustrating a structure of an all-solid battery according to an embodiment of the present invention.

As an example of the all-solid battery, FIG. 4 illustrates a schematic longitudinal sectional view of an all-solid thin film lithium secondary battery, according to an embodiment of the present invention.

The all-solid thin film lithium secondary battery includes a substrate 41, and a first current collector 42, a first electrode 43, a solid electrolyte 44, a second electrode 45, and a second current collector 46 that are stacked on the substrate 41. In this example, the first electrode 43 is a cathode and the second electrode 45 is an anode, however, the first electrode 43 may be an anode and the second electrode 45 may be a cathode. The all-solid thin film lithium secondary battery may be manufactured using a thin film manufacturing process by using a vacuum device such that the substrate 41, the first current collector 42, the first electrode 43, the solid electrolyte 44, the second electrode 45, and the second current collector 46 are sequentially stacked. Also, any other methods may be used to manufacture the all-solid thin film lithium secondary battery. In addition, a resin film or an aluminum laminate film may be disposed as a protective layer on the second current collector 46.

Examples of the substrate 41 include an electrically insulating substrate such as an alumina substrate, a glass substrate, and a polyimide film, a semiconductor substrate such as a silicon substrate, and a conductive substrate such as an aluminum substrate and a copper substrate. When the conductive substrate is used, to insulate the first current collector 42 from the second current collector 46, an electrically insulating material element is disposed either on a contact surface between the first current collector 42 and the substrate 41 or on a contact surface between the second current collector 46 and the substrate 41. In this regard, the substrate 41 may have a small surface roughness, and thus, a mirror surface plate may be used as the substrate 41.

The first current collector 42 disposed on the substrate 41 may be formed of an electronically conductive material, for example, platinum, platinum/palladium, gold, silver, aluminum, copper, or indium-tin-oxide (ITO). Also, any material that has electronic conductivity and does not react with the first electrode 43 may be used as the first current collector 42.

The first current collector 42 may be manufactured by sputtering, resistance heat deposition, ion beam deposition, or electron beam deposition. If the substrate 41 is formed of a conductive material such as aluminum, copper, or stainless steel, however, the first current collector 42 may not be necessary in all cases.

The first electrode (cathode) 43 may be formed of a cathode material used in a lithium secondary battery, such as $LiCoO_2$, $LiNiO_2$, or $LiMn_2O_4$, or a transition metal oxide, such as $V_2O_5$, $MoO_3$, or $TiS_2$. Also, any material used in a cathode of a lithium secondary battery may be used to prepare the first electrode 43.

The first electrode (cathode) 43 may be prepared by sputtering, resistance heat deposition, ion beam deposition, electron beam deposition, or laser ablation.

The solid electrolyte 44 may be a typical electrolyte used in an all-solid battery.

The protected anode described above is used as the second electrode (anode) 45.

The second current collector 46 may be formed of the same material as that of the first current collector 42. In addition, the second current collector 46 may be prepared using the same method as that used to prepare the first current collector 42.

The all-solid battery may have a stacked structure in which a plurality of the all-solid batteries is stacked.

In this embodiment, the all-solid thin film lithium secondary battery is described as an example of the all-solid battery, but the all-solid battery is not limited thereto.

One or more embodiments will now be described in further detail with reference to the following examples. These examples are for illustrative purposes only and are not intended to limit the scope of the one or more embodiments.

Preparation Example 1

Synthesis of $Li_{1.4}Al_{0.4}Ge_{1.6}(PO_4)_3$

Citric acid was dissolved in water to prepare a 0.2 M citric acid aqueous solution. 100 ml of the citric acid aqueous solution and 0.584 g of germanium butoxide were stirred at 95° C. for 20 hours.

0.097 g of lithium nitrate, 0.15 g of aluminum nitrate, and 0.345 g of $NH_4H_2PO_4$ were added to the stirred mixture and the resultant mixture was stirred for 0.5 hours. 5 g of ethylene glycol was added thereto and the resulting mixture was stirred at 120° C. for 0.5 hours and further at 150° C. for 0.5 hours.

The stirred resultant mixture was stirred at 170° C. for 6 hours and further at 500° C. for 4 hours and heat treated, and the heat treated mixture was stirred at 800° C. for 5 hours and heat treated.

The heat treated resultant was subjected to high energy mechanical milling (HEMM) in a ball mill together with ethanol. The milled resultant was pressed at 150 Pa and heat treated at 900° C. for 6 hours to obtain film-type $Li_{1.4}Al_{0.4}Ge_{1.6}(PO_4)_3$ (LGAP).

Example 1

Manufacture of Protected Anode and Cell

A cell was manufactured such that a $Li_7Ti_5O_{12}$ film and the LGAP film prepared according to Preparation Example 1 were sequentially stacked on a current collector in which an Au foil and an Al foil were sequentially stacked and a current collector in which an Al foil and an Au foil were sequentially stacked was stacked on the LGAP film.

Comparative Example 1

Manufacture of Anode and Cell

A copper foil, a lithium foil, the LGAP film of Preparation Example 1, a lithium foil, and a copper foil were sequentially stacked to manufacture a cell having a laminated structure of Cu foil-Li foil-LGAP film-Li foil-Cu foil.

Comparative Example 2

Manufacture of Anode and Cell

A copper foil, a lithium-indium alloy foil, the LGAP film of Preparation Example 1, a lithium-indium alloy foil, and a copper foil were sequentially stacked to manufacture a cell having a laminated structure of Cu foil-Li/In alloy foil-LGAP film-Li/In alloy foil-Cu foil.

Evaluation Example 1

Evaluation of Impedance and Conductivity of Cell

Figure 5A:
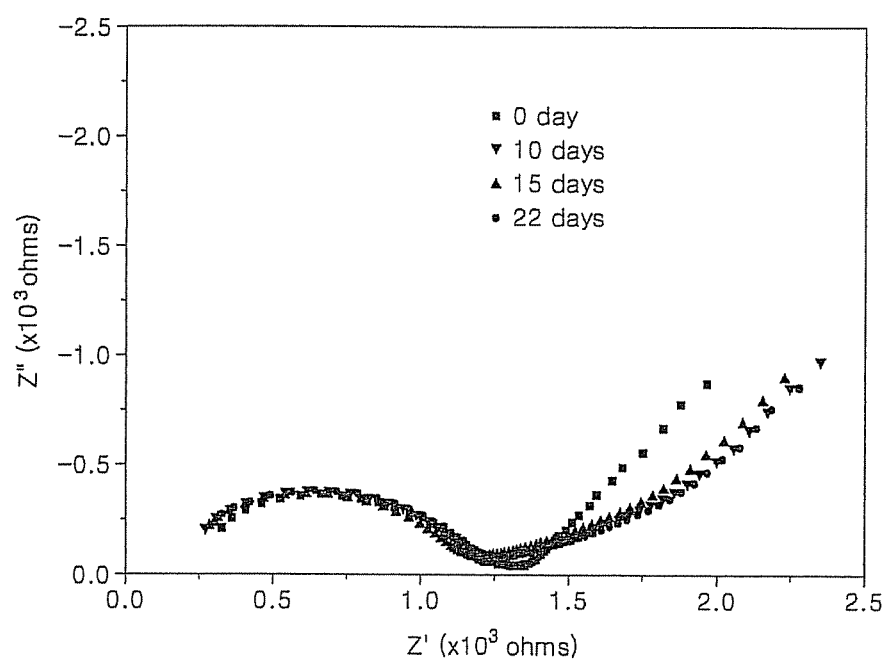
FIGS. 5A and 5B are graphs showing impedance and conductivity of a cell manufactured according to Example 1.
Figure 5B:
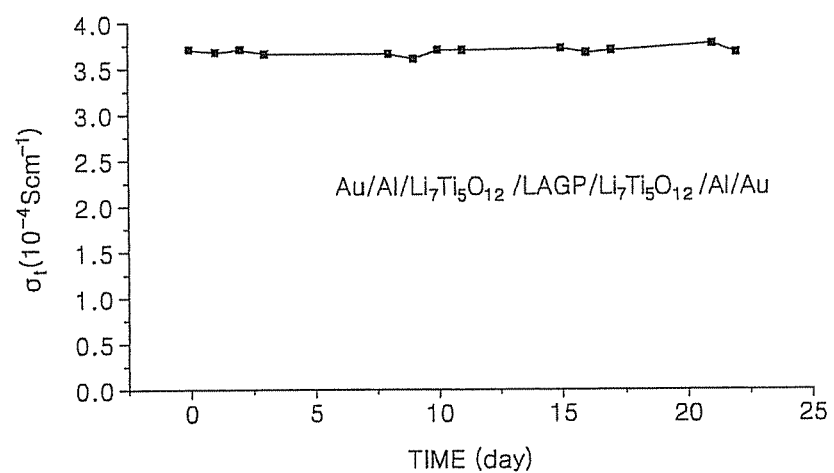
Figure 6A:
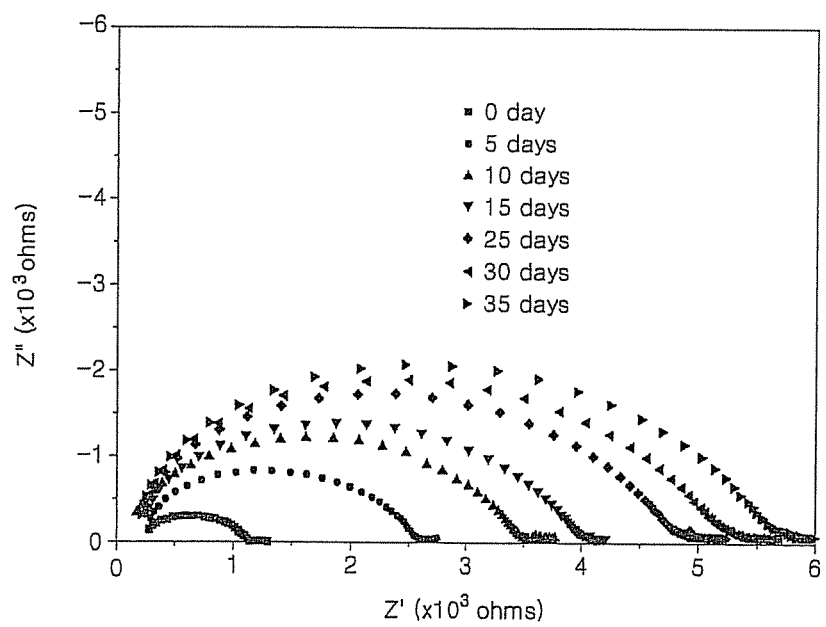
FIGS. 6A and 6B are graphs showing impedance and conductivity of a cell manufactured according to Comparative Example 1.
Figure 6B:
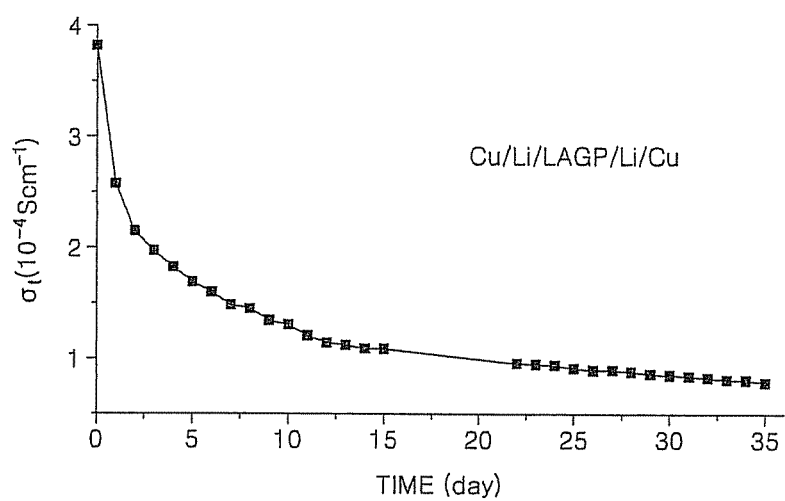

Impedances and conductivities of the cells manufactured according to Example 1 and Comparative Example 1 were evaluated, and the results are illustrated in FIGS. 5A and 5B (for Example 1) and FIGS. 6A and 6B (for Comparative Example 1).

The impedance was evaluated such that an alternating voltage of approximately 5 mV was applied as an open circuit voltage to each cell at about 1,000,000 Hz to about 0.1 Hz and the profile was illustrated as an impedance function having real and imaginary parts, and the conductivity was evaluated as a value obtained by back calculating the impedance values.

Referring to FIGS. 5A and 5B and FIGS. 6A and 6B, it is confirmed that the cell of Example 1 has a higher conductivity that that of the cell of Comparative Example 1.

Evaluation Example 2

Evaluation of Change in Conductivity of Cell

Figure 7:
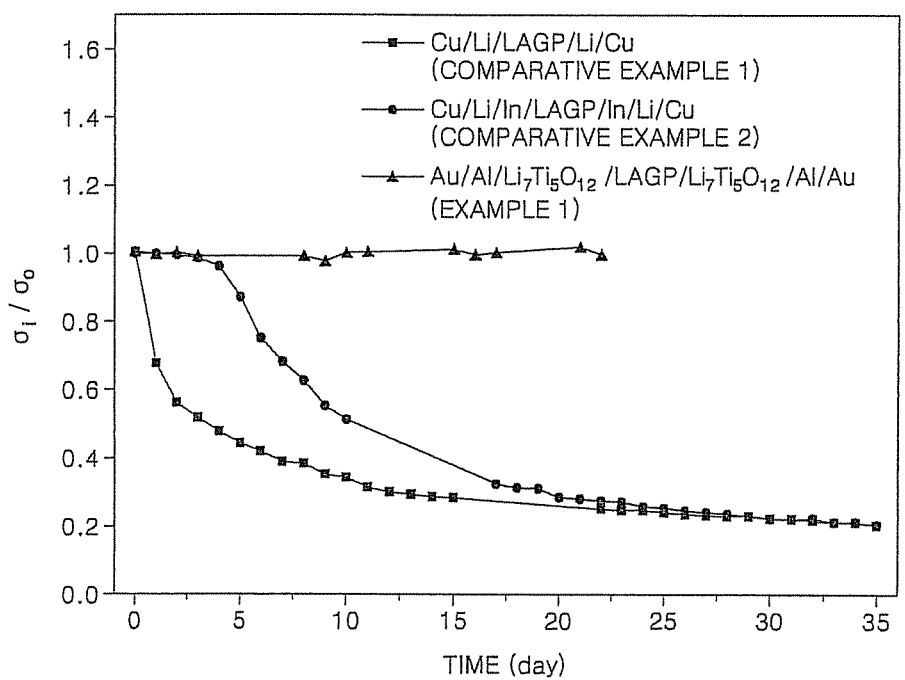
FIG. 7 is a graph showing a change in conductivity of each of the cells of Example 1 and Comparative Examples 1 and 2.

The change in conductivity of each of the cells of Example 1 and Comparative Examples 1 and 2 was evaluated, and the results are illustrated in FIG. 7.

The change in conductivity was evaluated using an impedance analyzer such that changes in conductivity were measured over 35 days.

Referring to FIG. 7, the cell of Example 1 has a higher conductivity than that of the cells of Comparative Examples 1 and 2 and has no change in conductivity over to time.

As described above, according to the one or more of the above embodiments of the present invention, a lithium air battery and an all-solid battery that include a protected anode with high stability may have high conductivity and excellent charge and discharge characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A protected anode comprising an anode comprising:
   a lithium titanium oxide represented by Formula 3 below as an anode active material; and
   a protective layer formed on the surface of the anode and comprising
   a compound represented by Formula 2 below:

$Li_{1+x}Al_xGe_{2-x}(PO_4)_3$  <Formula 2> wherein $0.3 \leq X \leq 0.7$, and $Li_{4+a}Ti_{5-b}M'_cO_{12-d}$  <Formula 3> wherein $-0.2 \leq a \leq 0.2$, $-0.3 \leq b \leq 0.3$, $0 \leq c \leq 0.3$, $-0.3 \leq d \leq 0.3$, and
   M' is at least one of a Group 1 element to a Group 6 element or a Group 8 element to a Group 15 element.

2. The protected anode of claim 1, wherein the compound of Formula 1 is one of $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, and $Li_{1.7}Al_{0.7}Ge_{1.3}(PO_4)_3$.

3. The protected anode of claim 1, wherein the lithium titanium oxide comprises $Li_4Ti_5O_{12}$ or $Li_7Ti_5O_{12}$.

4. The protected anode of claim 1, wherein the lithium titanium oxide comprises $Li_4Ti_5O_{12}$ or $Li_7Ti_5O_{12}$, and the compound of Formula 1 comprises $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, or $Li_{1.7}Al_{0.7}Ge_{1.3}(PO_4)_3$.

5. The protected anode of claim 1, further comprising, between the anode and the protective layer, at least one interlayer of a separator, a liquid electrolyte comprising a non-aqueous solvent and a lithium salt, an inorganic solid electrolyte membrane, a polymer solid electrolyte membrane, a gel-type polymer electrolyte membrane, or a lithium ion conductive solid electrolyte membrane.

6. The protected anode of claim 1, wherein the thickness ratio of the anode to the protective layer is in a range of about 0.001:1 to about 1,000:1.

7. A lithium air battery comprising:
   the protected anode according to claim 1; and
   a cathode comprising oxygen as a cathode active material.

8. The lithium air battery of claim 7, further comprising, between the protected anode and the cathode, at least one interlayer of a separator, a liquid electrolyte comprising a non-aqueous solvent and a lithium salt, an inorganic solid electrolyte membrane, a polymer solid electrolyte membrane, a lithium ion conductive solid electrolyte membrane, or a gel-type polymer electrolyte membrane.

9. The lithium air battery of claim 8, wherein the interlayer is a lithium ion conductive solid electrolyte membrane comprising a glass-ceramic solid electrolyte or a laminated structure of a glass-ceramic solid electrolyte and a polymer solid electrolyte.

10. The lithium air battery of claim 8, wherein the interlayer is at least one separator comprising a polypropylene film, a polyethylene film, a polypropylene non-fabric, or a polyphenylene sulfide non-fabric.

11. The lithium air battery of claim 8, wherein the interlayer is a liquid electrolyte comprising a non-aqueous solvent and a lithium salt.

12. The lithium air battery of claim 7, wherein the cathode comprises a porous carbonaceous material.

13. An all-solid battery comprising the protected anode according to claim 1.

14. The protected anode of claim 1, wherein the thickness of the anode is in the range of about 10 to about 300 μm.

15. The protected anode of claim 1, wherein the thickness of the protective layer is in the range of about 10 to about 500 μm.

16. The protected anode of claim 1, wherein the combined thickness of the anode and the protective layer is in the range of about 20 to about 800 μm.

17. A protected anode comprising an anode comprising:
    a lithium titanium oxide as an anode active material; and
    a protective layer formed on the surface of the anode and comprising one of $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, and $Li_{1.7}Al_{0.7}Ge_{1.3}(PO_4)_3$.

* * * * *